(12) United States Patent
Yoshimoto et al.

(10) Patent No.: US 9,132,894 B2
(45) Date of Patent: Sep. 15, 2015

(54) SPAR-TYPE FLOATING STRUCTURE

(75) Inventors: Haruki Yoshimoto, Tokyo (JP); Yuji Awashima, Kashiwa (JP); Hideyuki Suzuki, Tokyo (JP)

(73) Assignees: JAPAN MARINE UNITED CORPORATION (JP); THE UNIVERSITY OF TOKYO (JP)

( * ) Notice: Subject to any disclaimer, the term of this patent is extended or adjusted under 35 U.S.C. 154(b) by 58 days.

(21) Appl. No.: 14/003,634

(22) PCT Filed: Mar. 6, 2012

(86) PCT No.: PCT/JP2012/055676
§ 371 (c)(1),
(2), (4) Date: Oct. 11, 2013

(87) PCT Pub. No.: WO2012/121247
PCT Pub. Date: Sep. 13, 2012

(65) Prior Publication Data
US 2014/0026798 A1    Jan. 30, 2014

(30) Foreign Application Priority Data

Mar. 7, 2011    (JP) .................. 2011-049283

(51) Int. Cl.
*B63B 35/44*    (2006.01)
*F03D 11/04*    (2006.01)

(52) U.S. Cl.
CPC ............... *B63B 35/44* (2013.01); *F03D 11/04* (2013.01); *B63B 2035/442* (2013.01); *F05B 2240/93* (2013.01)

(58) Field of Classification Search
CPC ........ B63B 35/44; B63B 1/048; B63B 17/00; B63B 1/00; B63B 1/04; E02B 17/08; F03D 11/04
USPC ........ 114/264; 405/200, 209; 416/84; 290/44
See application file for complete search history.

(56) References Cited

U.S. PATENT DOCUMENTS 6,786,679 B2 *    9/2004    Huang et al. .................. 405/209
7,819,073 B2 *    10/2010    Sveen et al. .................. 114/264

FOREIGN PATENT DOCUMENTS

| JP | 2002-188557 A | 7/2002 |
| JP | 2005-069025 A | 3/2005 |
| JP | 2005-180351 A | 7/2005 |
| JP | 2009-018671 A | 1/2009 |
| JP | 2009-248792 A | 10/2009 |

OTHER PUBLICATIONS

Office Action issued in corresponding Japanese Patent Application No. 2013-503553 on Jun. 11, 2014, consisting of 3 pp.

* cited by examiner

*Primary Examiner* — Lars A Olson
(74) *Attorney, Agent, or Firm* — Volpe and Koenig, P.C.

(57) ABSTRACT

In a spar-type floating structure comprising a tall, thin floating body 2 and a ballast portion 3 provided to the floating body 2 so that the weight of the ballast portion 3 allows the floating body 2 to float in upright position, the floating body 2 includes a horizontally-extending first extended portion 21 arranged at the bottom, a horizontally-extending second extended portion 22 arranged in the middle, and a column portion connecting the first and second extended portions 21, 22 and extending up to the waterline, the first extended portion 21 forms the ballast portion 3, and the second extended portion 22 constitutes a buoyancy portion giving buoyancy to the floating body 2.

9 Claims, 11 Drawing Sheets

SPAR-TYPE FLOATING STRUCTURE

TECHNICAL FIELD

The present invention relates to a spar-type floating structure, specifically a spar-type floating structure having sufficient stability and experiencing reduced oscillating motions.

BACKGROUND ART

In recent years, from a viewpoint of preservation of global environment and effective use of natural energy, offshore wind power generation has been attracting attention. Various types of floating structures have been proposed for offshore wind power generation, including a spar type designed to have a center of gravity constantly below a center of buoyancy to ensure static stability; a TLP (tension leg platform) type designed to be moored by tensioned cables called tension legs; and a semi-submergible type designed to have a deck and a lower hull connected by columns to reduce the waterplane area (cross-sectional area at the waterline) and to reduce oscillating motions by utilizing a phase difference between wave forces acting on the submerged part. Among these types, the spar type is considered advantageous over the others in terms of costs.

Generally, the spar-type floating structure comprises a tall, thin, approximately-columnar floating body and a ballast portion provided at the bottom of the floating body so that the weight of the ballast portion allows the floating body, moored by cables, to float in upright position on the sea (see patent documents 1 and 2, for example).

For example, patent document 1 discloses a spar-type floating structure comprising an upper floating body with the waterline located on, a lower floating body greater in diameter than the upper floating body, and a ballast tank provided at the bottom of the lower floating body, and patent document 2 discloses a spar-type floating structure comprising an upper floating body with the waterline located on, a lower floating body greater in diameter than the upper floating body, and a ballast tank connected to the underside of the lower floating body by connecting steel pipes.

PRIOR ART DOCUMENT

Patent Document

Patent Document 1: JP 2009-18671 A
Patent Document 2: JP 2009-248792 A

SUMMARY OF THE INVENTION

Problems to be Solved by the Invention

The spar-type floating structure, which is likely to have a deep draft to ensure stability, is difficult to install in shallow marine areas. Further, as compared with the TLP-type floating structure, the spar-type floating structure experiences a great amplitude of heave and pitch (or roll), which makes it difficult to ensure the stability of the spar-type floating structure.

In addition, the spar-type floating structures disclosed in patent documents 1 and 2 have problems such that because of the small waterplane area, they have a short resonance period, which makes them likely to resonate with waves, and that because of the large floating body located near the waterline, they are susceptible to the influence of waves. These drawbacks of the spar-type floating structure are difficult to overcome.

The present invention has been made in view of the above problems. An object of the present invention is to provide a spar-type floating structure which has sufficient stability, suffers reduced oscillating motions, and is allowed to have a reduced draft.

Means for Solving the Problems

The present invention provides a spar-type floating structure comprising a tall, thin floating body and a ballast portion provided to the floating body so that the weight of the ballast portion allows the floating body to float in upright position, wherein the floating body includes a horizontally-extending first extended portion arranged at the bottom, a horizontally-extending second extended portion arranged in the middle, and a column portion connecting the first and second extended portions and extending up to the waterline, wherein the first extended portion forms the ballast portion, and the second extended portion constitutes a buoyancy portion giving buoyancy to the floating body.

The floating body may further include a horizontally-extending third extended portion arranged at the top of the column portion. The third extended portion may have a waterplane area corresponding to 10 to 300% of the average area of the floating body obtained by dividing the displaced volume by the draft of the floating body. For example, a columnar member with a reduced horizontal size is joined to the top of the third extended portion. A mooring cable for mooring the floating body may be connected to the third extended portion.

The second extended portion may have an inner volume corresponding to one fourth to three fourths of the displaced volume of the floating body. A Fairlead may be fitted to the side of the second extended portion to guide the floating-body mooring cable.

The first and second extended portions have sizes, for example determined to meet the requirement $GM = Iw/(\Delta \times \tan \theta)$ (, where GM is the metacentric height, Iw the wind overturning moment, $\Delta$ the displacement, and $\theta$ the allowable maximum angle of tilt).

A resisting body may be provided to surround the circumference of the first extended portion to adjust the dynamic response of the floating body. The resisting body may include an annular guard to prevent the floating-body mooring cables from becoming caught in.

Advantageous Effects of the Invention

In the present invention, waveless points can be easily provided by forming the first and second extended portions to the floating body, leading to reduced vertically-oscillating motions of the spar-type floating structure. Arranging the first extended portion at the bottom to form a ballast portion, and the second extended portion in the middle to constitute a buoyancy portion makes it easy to adjust the balance between the height of center of gravity and the height of center of buoyancy to ensure stability. This also contributes to reducing the amplitude of pitch (or roll). Thus, the spar-type floating structure according to the present invention has sufficient stability, suffers reduced oscillating motions, and is allowed to have a reduced draft.

By providing a third extended portion at the top of the column portion, it can be ensured that the waterline is located on the third extended portion in waves with small to normal heights, and on the part smaller in diameter than the third extended portion (i.e., the column portion or the columnar member in the superstructure) in waves with large heights. This means that the resonance period of vertically-oscillating motions, which is inversely proportional to the waterplane area, varies depending on the state of waves, leading to effectively-reduced vertically-oscillating motions. Particularly in waves with large heights, the spar-type floating structure with a long resonance period of vertically-oscillating motions can avoid resonance.

MODE FOR CARRYING OUT THE INVENTION

Figure 1:
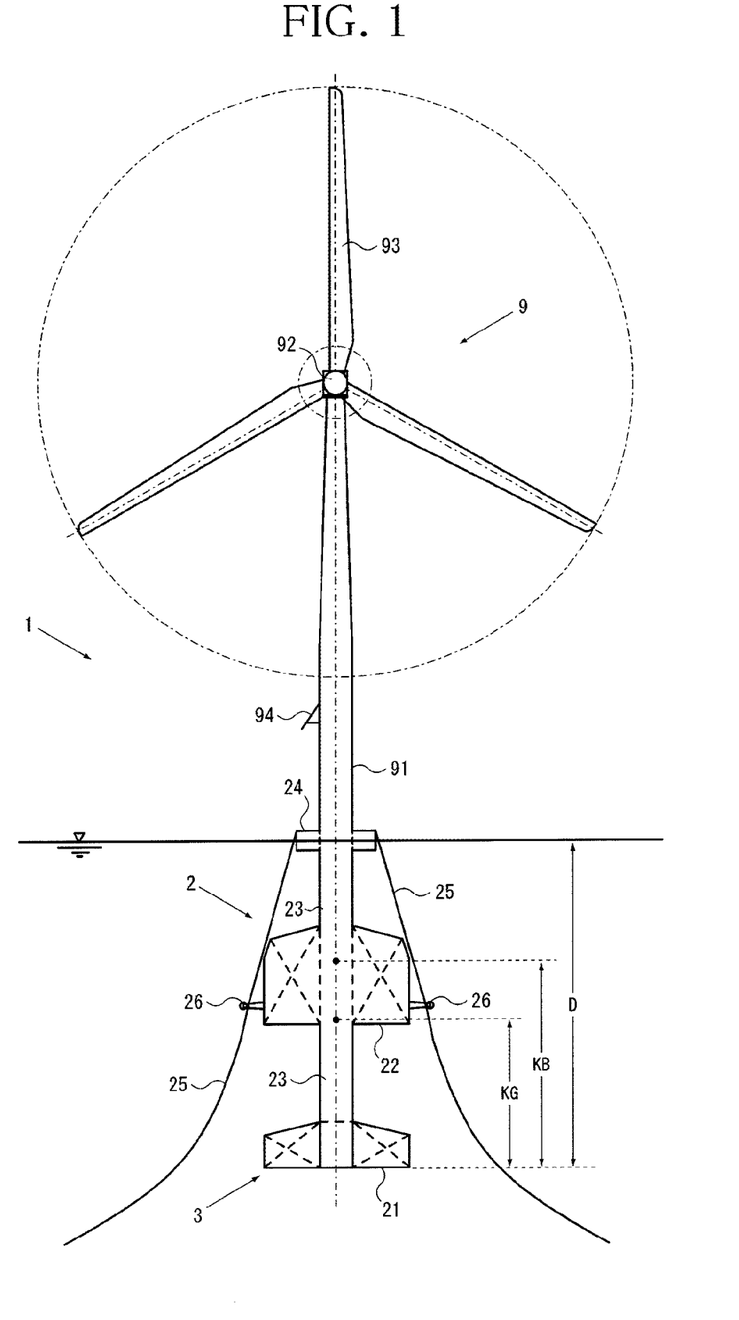
FIG. 1 is a diagram showing the overall configuration of a first embodiment of a spar-type floating structure according to the present invention.

With reference to FIGS. 1 to 5, embodiments of the spar-type floating structure according to the present invention will be described. FIG. 1 is a diagram showing the overall configuration of a first embodiment of the spar-type floating structure according to the present invention. FIGS. 2A to 2C are diagrams for explaining the function of a third extended portion, specifically, FIGS. 2A and 2B show the third extended portion in waves with a normal height and in waves with a large height, respectively, and FIG. 2C shows wave exciting force characteristic curves. FIGS. 3A and 3B are diagrams for explaining the function of a second extended portion, specifically, FIG. 3A is for explaining the functional principle and FIG. 3B shows a wave exciting force characteristic curve.

As seen in FIG. 1, the first embodiment of the present invention is a spar-type floating structure 1 comprising a tall, thin floating body 2 and a ballast portion 3 provided to the floating body 2 so that the weight of the ballast portion 3 allows the floating body 2 to float in upright position. The floating body 2 includes a horizontally-extending first extended portion 21 arranged at the bottom, a horizontally-extending second extended portion 2 arranged in the middle, and a column portion 23 connecting the first and second extended portions 21, 22 and extending up to the waterline. The first extended portion 21 forms the ballast portion 3, and the second extended portion forms a buoyancy portion giving buoyancy to the floating body 2.

The spar-type floating structure 1 is, for example intended for offshore wind power generation, and has a superstructure 9 comprising a columnar support 91, a nacelle 92 and blades 93. The columnar support 91 is mounted upright on the floating body 2 and supports the nacelle 92 and the blades 93. The nacelle 92 encloses a generator designed to generate electricity by rotation of the blades 93. The blades 93 are driven by wind. A solar panel 94 may be attached to the columnar support 91 to form a wind-solar hybrid power generation system, and thus, increase the system redundancy. The wind power generation system is an example of the superstructure 9 of the spar-type floating structure 1. Other systems or devices, including wind observation devices such as anemoscopes and anemometers, solar power generation devices, illumination devices, and radio communication devices, may be mounted.

The column portion 23 is a hollow cylinder with a draft D and forms part of the buoyancy portion giving buoyancy to the floating body 2. The column portion 23 forms a shaft of the floating body 2. As compared with the first and second extended portions 21, 22, the column portion 23 has a reduced horizontal size, or diameter. The tall, thin column portion 23 with the reduced horizontal size experiences reduced external forces from waves or tides. The column portion 23 may include a ballast tank to adjust the weight of the floating body 2 by putting ballast water into or out of the ballast tank 2.

The floating body 2 further includes a horizontally-extending third extended portion 24 arranged at the top of the column portion 23. The third extended portion 24 is thus larger in diameter than the column portion 23. The third extended portion 24 is a hollow cylinder and forms part of the buoyancy portion giving buoyancy to the floating body 2. In waves with normal heights, the waterline is on the third extended portion 24. The third extended portion 24 is also a base to which the columnar support 91 in the superstructure 9 is joined. The columnar member (support 91) with a reduced horizontal size is joined to the top of the third extended portion 24. The underside of the third extended portion 24 may be designed to allow engagement of claws of a crane or others installed on a work vessel during the floating body 2 installation work.

The upper side of the third extended portion 24 also serves as a work platform on which personnel carry out work, such as installation of the superstructure 9 and maintenance of the floating body 2. Mooring cables 25 for mooring the floating body 2 are connected, for example to the third extended portion 24, in which case, personnel on the upper side of the third extended portion 24 can easily carry out the connecting work.

Figure 2A:
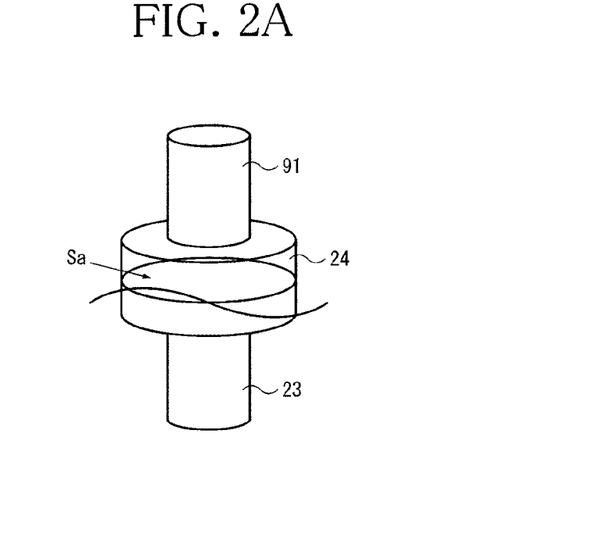
FIG. 2A is a diagram showing a third extended portion in waves with a normal height for explaining the function of the third extended portion.
Figure 2B:
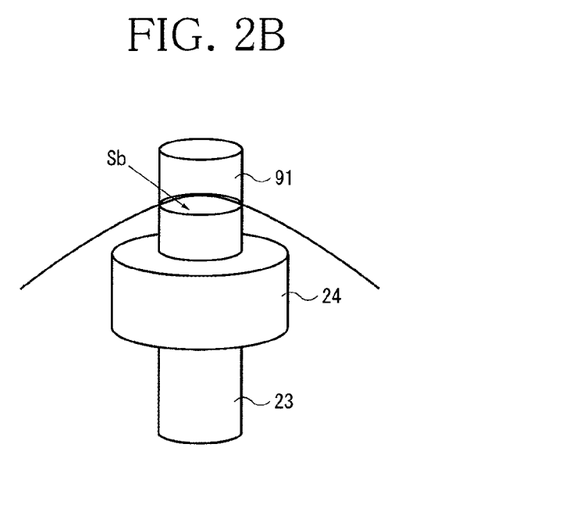
FIG. 2B is a diagram showing the third extended portion in waves with a large height for explaining the function of the third extended portion.
Figure 2C:
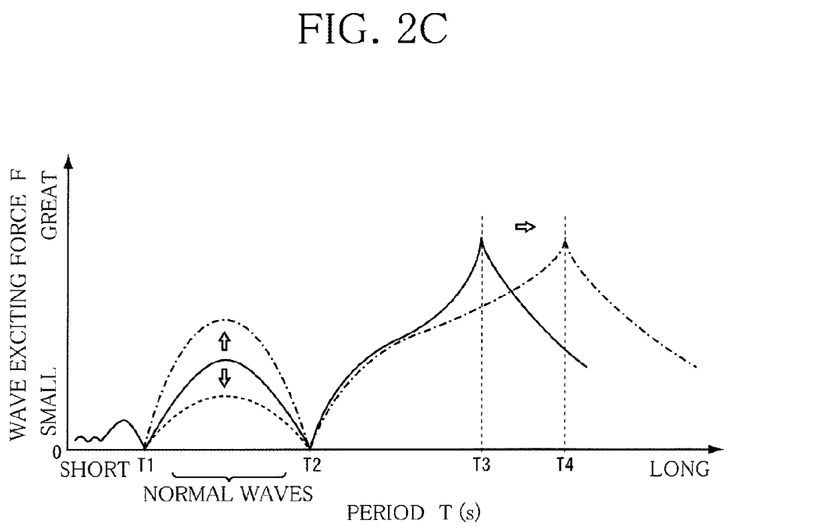
FIG. 2C is a diagram showing wave exciting force characteristic curves for explaining the function of the third extended portion.

With reference to FIGS. 2A to 2C, the function of the third extended portion 24 will be explained. As shown in FIG. 2A, the floating body 2 is designed such that in waves with normal heights, the waterline is located on the circumferential face of the third extended portion 24. Also in the calm water with wave heights smaller than the normal wave heights, the waterline is located on the circumferential face of the third extended portion 24. As shown in FIG. 2B, the floating body 2 is designed such that in waves with large heights, the waterline 91 corresponding to the wave crest is located on the circumferential face of the columnar support 91, above the third extended portion 24, and the waterline corresponding to the wave trough is located on the circumferential face of the column portion 23, below the third extended portion 24. Thus, as shown in FIGS. 2A and 2B, the waterplane area Sa in normal-height waves is greater than the waterplane area Sb in large-height waves.

The resonance period of vertically-oscillating motions of the floating body 2 is determined uniquely by the structure of the floating body 2. When the resonance period coincides with the period of the waves, the floating body 2 resonates, and thus, experiences a great amplitude of vertically-oscillating motions. FIG. 2C shows wave exciting force characteristic curves, where wave period T(s) and wave exciting force F are plotted on the abscissa and the ordinate, respectively. The wave exciting force F is vertical exciting force acting from the waves, which is represented as dimensionless quantity. Specifically, the wave exciting force F is represented by $F=|Ft|/\rho g\zeta\nabla^{2/3}$, where Ft is an exciting force acting from waves with a certain period t, $\rho$ the density of liquid, g the acceleration due to gravity, $\zeta$ the amplitude of incident waves, and $\nabla$ the displaced volume. FIG. 2C shows that waves with a period T1 or T2 do not produce exciting force F. The points on the wave exciting force characteristic curve representing the periods producing no wave exciting force is referred to as "waveless points". Generally, waves with normal heights have periods between T1 and T2. Waves with periods exceeding T2 have large heights. Provided that the floating body 2 has a wave exciting force characteristic curve represented by a solid line, T3 is the resonance period, or period with which the floating body 2 resonates.

To suppress the resonance of the floating body 2, the floating body should have a resonance period away from wave periods. As compared with normal-height waves, small-height waves have short periods, and large-height waves have long periods. Generally, large-height waves are less frequently generated than small-height waves. Considering these together, to suppress the resonance of the floating body 2, it is desired that the floating body 2 have a resonance period T4 on a chain-line curve in FIG. 2C, which is longer and farther away from the normal-height waves' periods T1 to T2 than the resonance period T3.

It is known that the resonance period is inversely proportional to the waterplane area, and thus, smaller waterplane area provides longer resonance period. However, reducing the waterplane area in consideration of large-height waves disadvantageously leads to greater amplitude of vertically-oscillating motions in normal-height waves (with periods T1 to T2), as indicated by a dashed-line curve in FIG. 2C. Given normal-height waves, larger waterplane area is desirable.

To deal with this problem, the third extended portion 24 is provided at the top of the column portion 23 to ensure that the waterline is located on the third extended portion 24 in normal-height waves and on the columnar support 91 or the column portion 23 in large-height waves so that the floating body 2 has a large waterplane area Sa in normal-height waves and a small water plane area Sb in large-height waves, as seen in FIGS. 1, 2A and 2B. This results in reduced vertically-oscillating motions in normal-height waves and suppressed resonance in large-height waves.

The third extended portion 24 has a waterplane area Sa corresponding to, for example 10 to 300% of the average area SaV of the floating body 2 obtained by dividing the displaced volume $\nabla$ by the draft D. The third extended portion 24 having a waterplane area Sa in this range is able to fulfill the above-described function effectively. When the floating body 2 is considered as a column with a uniform diameter, the average area Sav (=displaced volume $\nabla$ divided by draft D) is the cross-sectional area. Let us suppose that the displacement $\Delta$ is 8500 ton, the draft D 50 m, and the specific gravity 1. The average area Sav obtained as the cross-sectional area is 170 m². Thus, the waterplane area Sa should be determined within the range of 17 to 170 m², meeting the requirement that the waterplane area Sa is greater than the waterplane area Sb. The actual proportion or size of the waterplane area Sa is determined taking into consideration the displacement $\Delta$ of the floating body 2, the balance between the waterplane areas Sa and Sb and the environmental factors (including variations in wave period and wave amplitude) of the marine area in which to install the floating body.

As seen in FIG. 1, the first extended portion 21 is provided at the bottom of the column portion 23 to form a ballast portion 3. The ballast portion 3 formed by the first extended portion 21 may be a fixed ballast portion applying a fixed weight to the floating body 2, or a ballast tank capable of adjusting the weight of the floating body 2 by taking in or discharging ballast water, or a combination of fixed ballast and a ballast tank.

The second extended portion 22 is provided to the column portion 23 between the first and second extended portions 21, 24. As a result of providing a second extended portion 22 in the middle of the column portion 23 to horizontally extend from the column portion 23, and thus, have a larger diameter than the column portion 23, there are a number of surfaces resisting the vertically-oscillating motions of the waves. This makes it possible to effectively provide waveless points, or points producing no wave exciting force, thereby making it possible to effectively reduce the vertically-oscillating motions of the floating body 2.

Figure 3A:
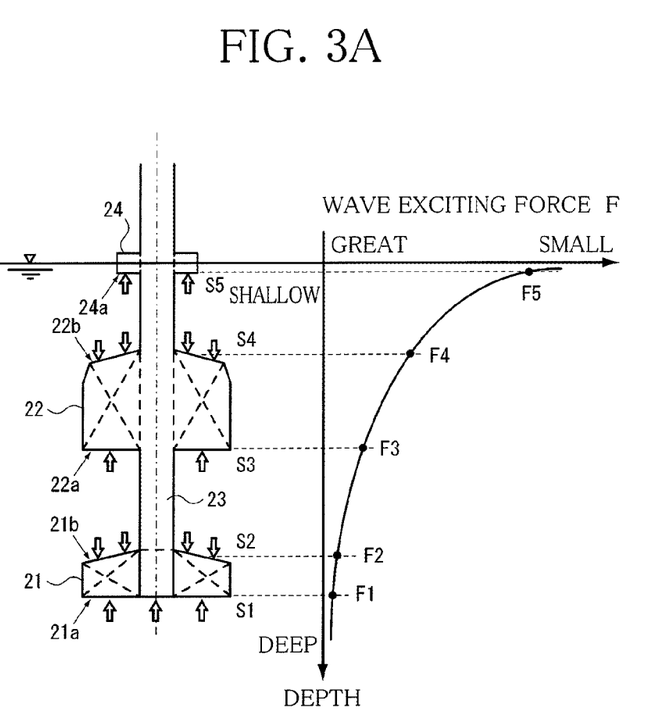
FIG. 3A is a diagram for explaining the functional principle of a second extended portion.

As shown in FIG. 3A, the floating body 2 has five resisting surfaces: the lower surface 21a (of area S1) and the upper surface 21b (of area S2) of the first extended portion 21, the lower surface 22a (of area S3) and the upper surface 22b (of area S4) of the second extended portion 22, and the lower surface 24a (of area S5) of the third extended portion 24. The lower surfaces 21a, 22a, 24a serve as surfaces resisting upward wave exciting forces, while the upper surfaces 21b, 22b serve as surfaces resisting downward wave exciting forces.

As shown in FIG. 3A, generally, wave exciting force F is greater at a shallower depth, and smaller at a deeper depth. Here, the wave exciting forces at the depths of the lower surface 21a of the first extended portion 21, the upper surface 21b thereof, the lower surface 22a of the second extended portion 22, the upper surface 22b thereof and the lower surface 24a of the third extended portion 24 are represented by F1, F2, F3, F4, F5, respectively. With regard to the tilted surfaces (upper surfaces 21a, 22b, for example), the exciting forces at the average depths are indicated for convenience sake.

Figure 3B:
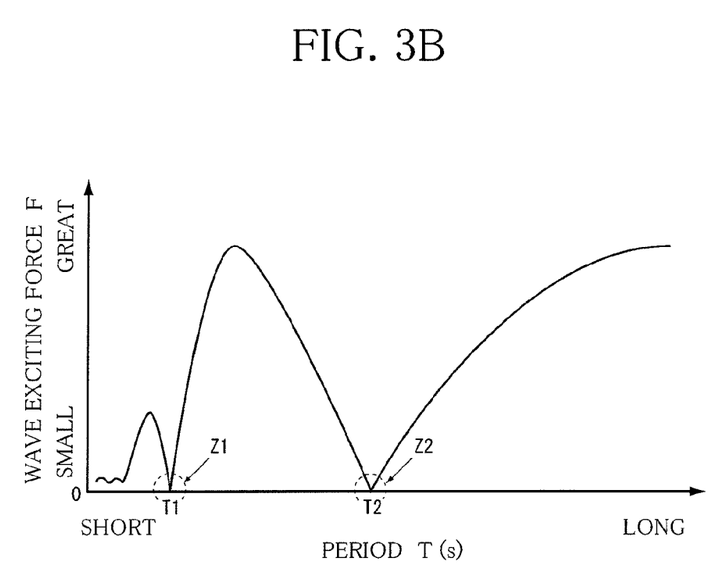
FIG. 3B is a diagram showing a wave exciting force characteristic curve for explaining the function of the second extended portion.

Thus, the pressure acting on the lower surface 21a of the first extended portion 21 is S1×F1, the pressure acting on the lower surface 22a of the second extended portion 22 is S3×F3, and the pressure acting on the lower surface 24a of the third extended portion 24 is S5×F5, while the pressure acting on the upper surface 21b of the first extended portion 21 is S2×F2 and the pressure acting on the upper surface 22b of the second extended portion 22 is S4×F4. As a result of providing the second extended portion 22 in addition to the first and third extended portions 21, 24, the floating body 2 has a number of pressure-receiving surfaces allowing pressures to counteract each other. This results in waveless points Z1, Z2, or in other words, wave periods producing no wave exciting force F (wave periods T1, T2, for example), as shown in FIG. 3B. In FIG. 3B showing a wave exciting force characteristic curve, wave period and wave exciting force are plotted on the abscissa and the ordinate, respectively, as in FIG. 2C.

The sizes (capacities or inner volumes) of the first and second extended portions 21, 22 are determined to meet the requirement GM=Iw/(Δ×tan θ) (, where GM is the metacentric height, Iw the wind overturning moment, Δ the displacement, and θ the allowable maximum angle of tilt). The metacentric height GM is obtained by GM=KB+BM−KG, where KB is the height of center of buoyancy (see FIG. 1), BM the metacentric radius, and KG the height of center of gravity (see FIG. 1). The metacentric radius BM is obtained by BM=Ix/∇ (, where ∇ is the displaced volume), and Ix is the moment of inertia of the water plane around the central axis of the floating body. In the floating body 2 shown in FIG. 1, the metacentric radius BM is approximately zero, which allows the approximation GM=KB−KG.

The metacentric height GM is one of the parameters indicating the stability. With a greater GM, the spar-type floating structure 1 is less likely to tilt and quicker to return to the upright position, and with a smaller GM, it is more likely to tilt and slower to return to the upright position. The righting moment Ir at the allowable maximum angel θ of tilt is obtained by Ir=GM×(Δ×tan θ). By balancing this righting moment Ir with the wind overturning moment Iw in the marine area in which to install the spar-type floating structure 1, the stability of the spar-type floating structure 1 can be maintained. In other words, it is desirable to satisfy the equation Iw=Ir=GM×(Δ×tan θ), which is rearranged to GM=Iw/(Δ×tan θ). This implies that greater GM provides resistance against greater wind overturning moment Iw, and thus, ensures higher stability of the spar-type floating structure 1.

Since the metacentric height GM is approximated by GM=KB−KG, it is desirable to increase the height KB of center of buoyance and decrease the height KG of center of gravity. However, too high metacentric height GM leads to pitch and roll with a short period, and thus, rapid oscillating motions. In addition, with the large-volume second extended portion 22 located nearer to the water surface, the spar-type floating structure is more susceptible to the wave exciting force. Thus, bearing in mind that greater height KB of center of buoyancy and smaller height KG of center of gravity are desirable for stability, the height KB of center of buoyancy and the height KG of center of gravity are so determined as to reduce the displacement Δ of the floating body 2 while ensuring the stability higher than or equal to that of the conventional structure.

Specifically, the optimal heights KB, KG of center of buoyance and center of gravity for reducing the oscillating motions can be obtained, for example by performing simulation on the desired spar-type floating structure 1, in which the second extended portion 22 is gradually moved upward from the level close to the first extended portion 21. Through such simulation, the second extended portion 22 is arranged approximately in the middle of the draft D to include the center of buoyancy KB or the center of gravity KG, for example.

The second extended portion 22 has an inner volume corresponding to 20 to 80% of the displaced volume ∇ of the floating body 2, desirably one fourth to three fourths thereof. The second extended portion 22 of such size (capacity or inner volume) effectively gives buoyancy to the floating body 2. The second extended portion 2 is formed with a geometry not interfering with the mooring cables 25 to prevent the second extended portion 22 from wearing and/or cutting the mooring cables 25. The horizontal size (diameter or radius if the second extended portion is of columnar shape) and the height (vertical size) of the second extended portion 22 can be determined after determining the volume and the position of the second extended portion 22 to meet the aforementioned requirements.

To the side of the second extended portion 22, fairleads 26 are fitted to guide the floating body 2 mooring cables 25. Each fairlead 26 comprises, for example a pair of arms joined to the side of the second extended portion 22 and a roll rotatably supported by the arms. The mooring cable 25 is passed between the roll and the side of the second extended portion 22. The fairleads 26 are fitted to the side of the second extended portion 22 approximately at the middle of the draft D, for example. Generally, marine currents and tidal currents act on the floating body 2 approximately at the middle of the draft D. Thus, the fairleads 26 arranged approximately at the point of action allow the mooring cables 25 to effectively support the floating body 2, minimizing the influence of the marine currents and tidal currents. The fairleads 26 in the Figure are presented just by way of example; fairleads of different configuration may be applied.

Figure 4A:
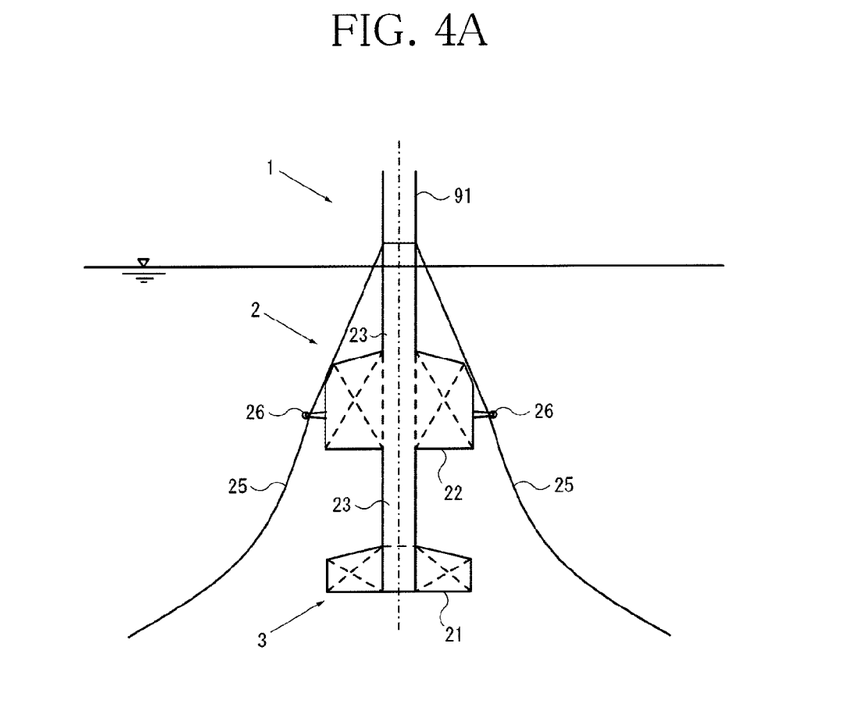
FIG. 4A is a diagram showing a second embodiment of the spar-type floating structure according to the present invention.

Next, other embodiments of the spar-type floating structure 1 according to the present invention will be described. FIG. 4A shows a second embodiment and FIG. 4B a third embodiment of the spar-type floating structure according to the present invention. FIGS. 5A to 5C are diagrams for explaining a resisting body. Specifically, FIG. 5A is a top view of a resisting body shown in FIG. 4B, FIG. 5B a cross-sectional view of a variant of the resisting body, and FIG. 5C a top view of the variant. In each drawing, the components similar to those of the first embodiment are assigned the same reference characters to omit the repetitive description of those components.

A second-embodiment spar-type floating structure shown in FIG. 4A differs from the first embodiment in that the third extended portion 24 is omitted. Even without the third extended portion 24, the floating body 2 equipped with the first and second extended portions 21, 22 can exhibit at least the effect of the second extended portion 22. Specifically, the spar-type floating structure 1 comprising this type of the floating body has sufficient stability and experiences reduced oscillating motions as compared with the conventional floating structure, and is allowed to have a reduced draft.

Figure 4B:
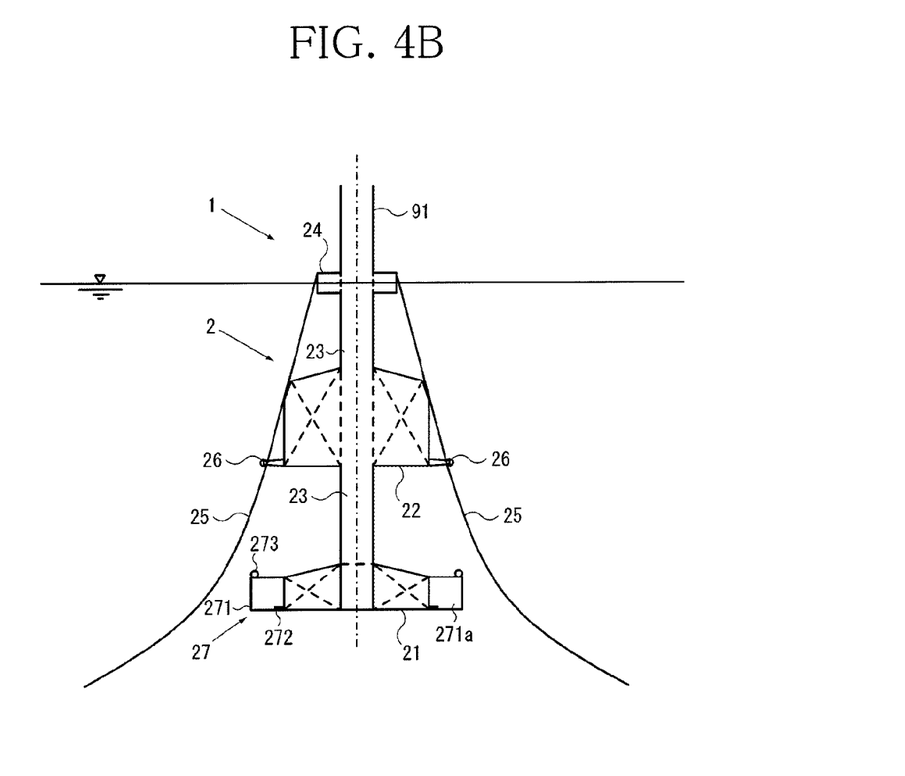
FIG. 4B is a diagram showing a third embodiment of the spar-type floating structure according to the present invention.
Figure 5A:
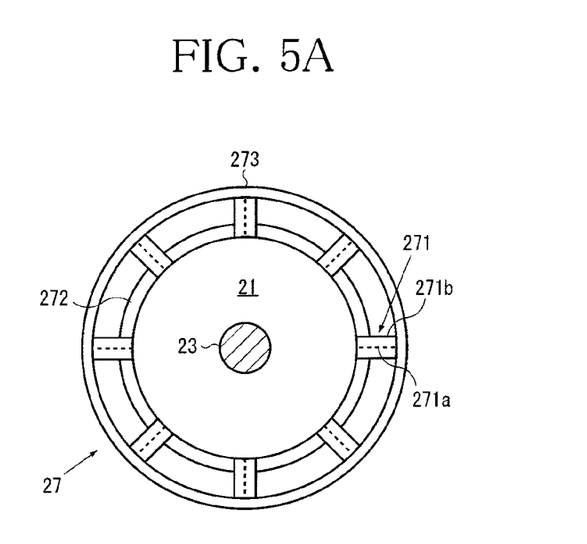
FIG. 5A is an explanatory top view of a resisting body shown in FIG. 4B.
Figure 5B:
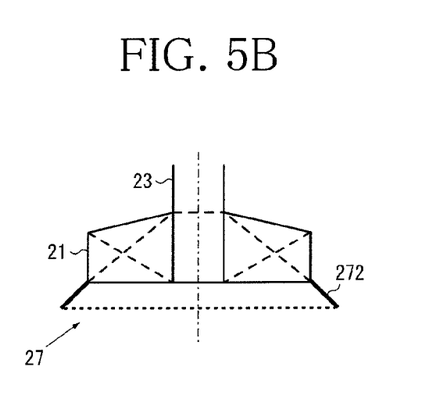
FIG. 5B is an explanatory cross-sectional view of a variant of the resisting body of FIG. 4B.
Figure 5C:
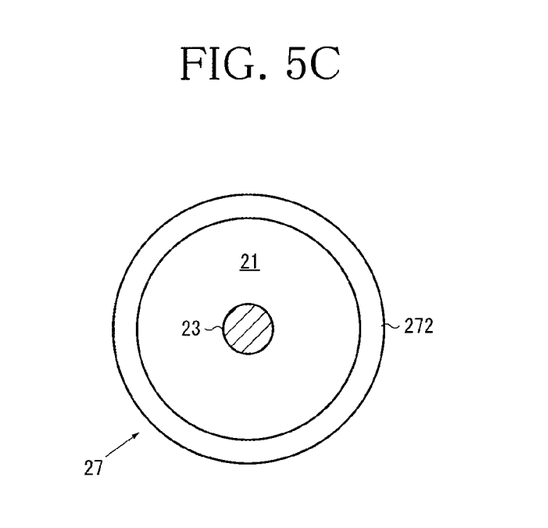
FIG. 5C is an explanatory top view of the variant of the resisting body of FIG. 4B.

A third-embodiment spar-type floating structure 1 shown in FIG. 4B differs from the first embodiment in that a resisting body 27 is provided to surround the circumference of the first extended portion 21 to adjust the dynamic response of the floating body 2. As seen in FIGS. 4B and 5A, the resisting body 27 comprises, for example a plurality of fins 271 radially extending from the side of the first extended portion 21, a horizontally-projecting annular bilge keel 272 provided at the bottom of the first extended portion 21, and an annular guard 273 provided to prevent the floating body 2 mooring cables 25 from becoming caught in.

The fins 271 can suppress yaw (rotation) of the floating body 2. Each fin 271 comprises, for example a fin body 271a joined to the side of the first extended portion 21 with its face upright, and an outer rim 271b joined to surround the fin body 271a. The rim formed of bars to surround the fin body 271 provides a recess on either side of the fin body 271a, thereby allowing the fluid to stay in the recess. This effectively increases the floating body 2's resistance to yaw (rotation). In addition, the bilge keel 272 provides resisting surfaces to suppress the vertically-oscillating motions of the floating body 2. The bilge keel 272 may, however, be omitted according to the circumstances. The guard 273 arranged on top of the fins to connect the outer ends of the fins prevents the mooring cables 25 from coming between the fins 271.

The variant of the resisting body 27 shown in FIGS. 5B and 5C consists only of a bilge keel 272. The bilge keel 272, or variant resisting body is a plate shaped to have a conical surface widening from the bottom of the first extended portion 21 downward. The bilge keel 272 with the conical surface provides a recess inside, which allows the fluid to stay, thereby effectively increasing the floating body 2's resistance to the vertically-oscillating motions.

The present invention is not restricted to the described embodiments, which may be modified in various ways without departing from the scope and spirit of the present invention. For example, the geometry of the first, second and third extended portions 21, 22, 24 may be modified as appropriate, as long as the aforementioned requirements are met.

EXPLANATION OF REFERENCE SIGNS

1 Spar-type floating structure
2 Floating body
3 Ballast portion
21 First extended portion
22 Second extended portion
23 Column portion
24 Third extended portion
25 Mooring cable
26 Fairlead
27 Resisting body
91 Columnar support (columnar member)
273 Guard

The invention claimed is:

1. A spar-type floating structure comprising an elongate floating body and a ballast portion provided to the floating body so that the weight of the ballast portion allows the floating body to float in upright position, wherein
the floating body includes a horizontally-extending first extended portion arranged at the bottom, a horizontally-extending second extended portion arranged in the middle, a hollow, cylindrical column portion connecting the first and second extended portions and extending up to a waterline, and a hollow, cylindrical third extended portion extending horizontally and fixedly arranged at the top of the column portion, wherein
the first extended portion forms the ballast portion,
the second extended portion constitutes a buoyancy portion giving buoyancy to the floating body, and
the waterline is located on the third extended portion in waves with normal heights and located on the column portion in waves with large heights.

2. The spar-type floating structure according to claim 1, wherein the third extended portion has a waterplane area corresponding to 10 to 300% of the average area of the floating body obtained by dividing the displaced volume by the draft of the floating body.

3. The spar-type floating structure according to claim 1, wherein a columnar member with a reduced horizontal size is joined to the top of the third extended portion.

4. The spar-type floating structure according to claim 1, wherein a mooring cable for mooring the floating body is connected to the third extended portion.

5. The spar-type floating structure according to claim 1, wherein the second extended portion has an inner volume corresponding to one fourth to three fourths of the displaced volume of the floating body.

6. The spar-type floating structure according to claim 5, wherein a fairlead is provided to the side of the second extended portion to guide the floating-body mooring cable.

7. The spar-type floating structure according to claim 1, wherein the first and second extended portions have sizes determined to meet the requirement $GM=Iw/(\Delta \times \tan \theta)$ where GM is the metacentric height, Iw is the wind overturning moment, $\Delta$ is the displacement, and $\theta$ is the allowable maximum angle of tilt.

8. The spar-type floating structure according to claim 1, wherein a resisting body is provided to surround the circumference of the first extended portion to adjust the dynamic response of the floating body.

9. The spar-type floating structure according to claim 8, wherein the resisting body includes an annular guard to prevent the floating-body mooring cables from becoming caught in.

* * * * *